(12) United States Patent
Wey et al.

(10) Patent No.: US 11,784,741 B2
(45) Date of Patent: Oct. 10, 2023

(54) OPTICAL NETWORK UNIT REGISTRATION METHOD FOR WAVELENGTH-SELECTED WAVELENGTH DIVISION MULTIPLEXING PASSIVE OPTICAL NETWORK

(71) Applicant: ZTE Corporation, Guangdong (CN)

(72) Inventors: Jun Shan Wey, Guangdong (CN); Junwen Zhang, Guangdong (CN)

(73) Assignee: ZTE Corporation, Guangdong (CN)

(*) Notice: Subject to any disclaimer, the term of this patent is extended or adjusted under 35 U.S.C. 154(b) by 325 days.

(21) Appl. No.: 17/196,920

(22) Filed: Mar. 9, 2021

(65) Prior Publication Data

US 2021/0281351 A1    Sep. 9, 2021

Related U.S. Application Data

(63) Continuation of application No. PCT/CN2019/105162, filed on Sep. 10, 2019, which
(Continued)

(51) Int. Cl.
*H04B 10/00* (2013.01)
*H04J 14/02* (2006.01)
(Continued)

(52) U.S. Cl.
CPC ...... *H04J 14/0234* (2013.01); *H04J 14/0236* (2013.01); *H04J 14/0242* (2013.01); *H04L 65/1073* (2013.01)

(58) Field of Classification Search
CPC ............... H04J 14/0241; H04J 14/0242; H04J 14/0245; H04J 14/0246; H04J 14/0249; H04J 14/025
See application file for complete search history.

(56) References Cited

U.S. PATENT DOCUMENTS 9,692,647 B2    6/2017  Bang
2007/0230957 A1*  10/2007  Ozaki ................ H04J 14/0246
                                                        398/71
(Continued)

FOREIGN PATENT DOCUMENTS

CN    101742365 A    6/2010
CN    105830369      8/2016
(Continued)

OTHER PUBLICATIONS

First Office Action for Chinese Application No. 2019800739974 dated Dec. 23, 2021, 14 pages (with unofficial translation).
(Continued)

*Primary Examiner* — Daniel G Dobson
(74) *Attorney, Agent, or Firm* — Perkins Coie LLP

(57) ABSTRACT

A method of communication includes receiving, by an optical line terminal (OLT), a registration request from an optical network unit (ONU) through a specific upstream wavelength, assigning, by the OLT, out of a plurality of normal service upstream wavelengths and a plurality of normal service downstream wavelengths in a wavelength resource pool, a normal service upstream wavelength and a normal service downstream wavelength to the ONU for a normal service between the ONU and the OLT, and informing, through a specific downstream wavelength, the ONU of information regarding the normal service upstream wavelength and the normal service downstream wavelength. The specific downstream and upstream wavelengths are reserved for a registration process that includes receiving, through the specific upstream wavelength, the registration request and sending, through the specific downstream wavelength, the information regarding the normal service upstream wavelength and the normal service downstream wavelength.

18 Claims, 7 Drawing Sheets

Related U.S. Application Data is a continuation of application No. 16/127,205, filed on Sep. 10, 2018, now Pat. No. 10,644,825.

(51) Int. Cl.
*H04L 65/1073* (2022.01)
*H04J 14/00* (2006.01)

(56) References Cited

U.S. PATENT DOCUMENTS

2009/0263130 A1* 10/2009 Luo .................. H04B 10/27
398/58
2018/0213307 A1 7/2018 Lin et al.

FOREIGN PATENT DOCUMENTS

| CN | 105830369 A | 8/2016 |
| CN | 106162386 | 11/2016 |
| EP | 2840742 | 2/2015 |

OTHER PUBLICATIONS

International Search Report and Written Opinion for International Application No. PCT/CN2019/105162, dated Nov. 25, 2019.
Co-Pending EP Application No. 19860519.8, Extended Search Report dated May 9, 2022, 10 pages.
Co-Pending EP Application No. 19860519.8, Extended Search Report dated May 27, 2022, 1 page.

\* cited by examiner

OPTICAL NETWORK UNIT REGISTRATION METHOD FOR WAVELENGTH-SELECTED WAVELENGTH DIVISION MULTIPLEXING PASSIVE OPTICAL NETWORK

CROSS REFERENCE TO RELATED APPLICATIONS

This application is a continuation of International PCT Application No. PCT/CN2019/105162, filed on Sep. 10, 2019, which is a continuation of and claims the benefit of priority of U.S. patent application Ser. No. 16/127,205, filed on Sep. 10, 2018, now U.S. Pat. No. 10,644,825. The entire content of the before-mentioned patent applications is incorporated by reference as part of the disclosure of this document.

TECHNICAL FIELD

The present document relates to optical communication systems.

BACKGROUND

In recent years, optical fiber communication technologies are being developed rapidly, including a passive optical network (PON) to provide high speed broadband services to end users. A wavelength division multiplexing (WDM) PON, among others, provides a dedicated bandwidth of a logical point-to-point network between optical line terminal (OLT) at the telecommunication central office and a number of optical network units (ONUs) at the end users' locations. Generally, the ONUs and OLT search and choose their working wavelength to establish a network connection. In order to meet increasing demand, therefore, equipment manufacturers and network operators are continually looking for ways to improve efficiency in establishing the network connection.

SUMMARY

The present document discloses techniques for effective ONU registration that can be conducted by using a pre-specified wavelength dedicated to ONU registration.

In one example aspect, a method of communication includes several steps. One step includes receiving, by an optical line terminal (OLT), a registration request from an optical network unit (ONU) through a specific upstream wavelength. Another step includes assigning, by the OLT a normal service upstream wavelength and a normal service downstream wavelength to the ONU for a normal service between the ONU and the OLT. The normal service upstream wavelength and the normal service downstream wavelength are assigned from a wavelength resource pool including a plurality of normal service upstream wavelengths and a plurality of normal service downstream wavelengths therein. Additional step includes informing, through a specific downstream wavelength, the ONU of information regarding the normal service upstream wavelength and the normal service downstream wavelength. Here, the specific downstream and upstream wavelengths are reserved for a registration process that includes receiving, through the specific upstream wavelength, the registration request and sending, through the specific downstream wavelength, the information regarding the normal service upstream wavelength and the normal service downstream wavelength.

In another example aspect, a method of communication includes several steps. One step includes tuning an optical network unit (ONU) to a specific downstream wavelength and a specific upstream wavelength. Another step includes receiving, by the ONU, a discovery window message for registration through the specific downstream wavelength, from an optical line terminal (OLT). Additional step includes sending, by the ONU, a registration request to the OLT through the specific upstream wavelength. Additional step includes receiving, by the ONU, a registration confirmation message from the OLT. Additional step includes sending, by the ONU, an acknowledgement to the OLT through the specific upstream wavelength in response to the registration confirmation. Additional step includes configuring the ONU to a normal service upstream wavelength and a normal service downstream wavelength, out of a plurality of normal service upstream wavelengths and a plurality of normal service downstream wavelengths in a wavelength resource pool, for a normal service between the ONU and the OLT. Here, the specific downstream and upstream wavelengths are reserved for a registration process including sending the registration request and the registration confirmation and receiving the acknowledgement and information regarding the normal service upstream wavelength and the normal service downstream wavelength.

In yet another example aspect, an optical transceiver apparatus includes an I/O interface coupled via an optical transmission medium to another optical transceiver apparatus, a memory to store executable instructions, and a processor in communication with the receiver. The processor enables an optical line terminal (OLT) to perform multiple tasks. An optical line terminal (OLT) receives a registration request provided by an optical network unit (ONU) through a specific upstream wavelength. The OLT assigns an available wavelength from a wavelength resource pool to the ONU. The OLT informs, through a specific downstream wavelength, the ONU of information regarding the assigned upstream and downstream wavelengths so that the ONU establishes a logical point-to-point data connection with the OLT. Here, the specific downstream and upstream wavelengths are reserved for a registration process including sending and receiving the registration request and the information regarding the assigned upstream and downstream wavelengths.

In yet another example aspect, an optical transceiver apparatus includes an I/O interface coupled via an optical transmission medium to another optical transceiver apparatus, a memory to store executable instructions, and a processor in communication with the receiver. The processor enables an optical network unit (ONU) to perform multiple tasks. The ONU is tuned to a specific downstream wavelength and a specific upstream wavelength. Subsequently, the ONU receives discovery window message for registration on the specific downstream wavelength, from an optical line terminal (OLT). The ONU sends a registration request to the OLT through the specific upstream wavelength, and then sends an acknowledgement to the OLT through the specific upstream wavelength in response to a registration confirmation sent from the OLT. The ONU configures a transceiver to a power level and upstream and downstream wavelengths assigned to the ONU so that the ONU establishes a logical point-to-point data connection with the OLT. Here, the specific downstream and upstream wavelengths are reserved for a registration process including sending and receiving the registration request, the registration confirmation, the acknowledgement, and information regarding the assigned upstream and downstream wavelength.

In yet another example aspect, a computer program product includes a computer readable memory having executable instructions stored thereupon. The executable instructions, when executed, causes a processor to perform multiple tasks. An optical line terminal (OLT) receives a registration request provided by an optical network unit (ONU) through a specific upstream wavelength. The OLT assigns an available wavelength from a wavelength resource pool to the ONU. The OLT informs, through a specific downstream wavelength, the ONU of information regarding the assigned upstream and downstream wavelengths so that the ONU establishes a logical point-to-point data connection with the OLT. Here, the specific downstream and upstream wavelengths are reserved for a registration process including sending and receiving the registration request and the information regarding the assigned upstream and downstream wavelengths.

In yet another example aspect, a computer program product includes a computer readable memory having executable instructions stored thereupon. The executable instructions, when executed, causes a processor to perform multiple tasks. An optical network unit (ONU) is tuned to a specific downstream wavelength and a specific upstream wavelength. The ONU receives discovery window message for registration on the specific downstream wavelength, from an optical line terminal (OLT). The ONU sends a registration request to the OLT through the specific upstream wavelength, and then send an acknowledgement to the OLT through the specific upstream wavelength in response to a registration confirmation sent from the OLT. The ONU configures a transceiver to a power level and upstream and downstream wavelengths assigned to the ONU so that the ONU establishes a logical point-to-point data connection with the OLT. Here, the specific downstream and upstream wavelengths are reserved for a registration process including sending and receiving the registration request, the registration confirmation, the acknowledgement, and information regarding the assigned upstream and downstream wavelength.

These and other aspects, and their implementations and variations are set forth in the drawings, the description and the claims.

DETAILED DESCRIPTION

A passive optical network (PON) includes an optical line terminal (OLT), an optical network units (ONU), and an optical distribution network (ODN). In a PON, the OLT at the central office serves a plurality of ONUs at end users' through a single ODN. A wavelength division multiplexing (WDM)-PON provides each ONU and subscribers connected to such an ONU with at least one dedicated pair of wavelength channels including downstream and upstream, creating logical point-to-point data connections between the OLT and the ONU. The WDM-PON does not require multiple access techniques for the upstream direction as a dedicated upstream wavelength channel is continuously available to each ONU.

Figure 1:
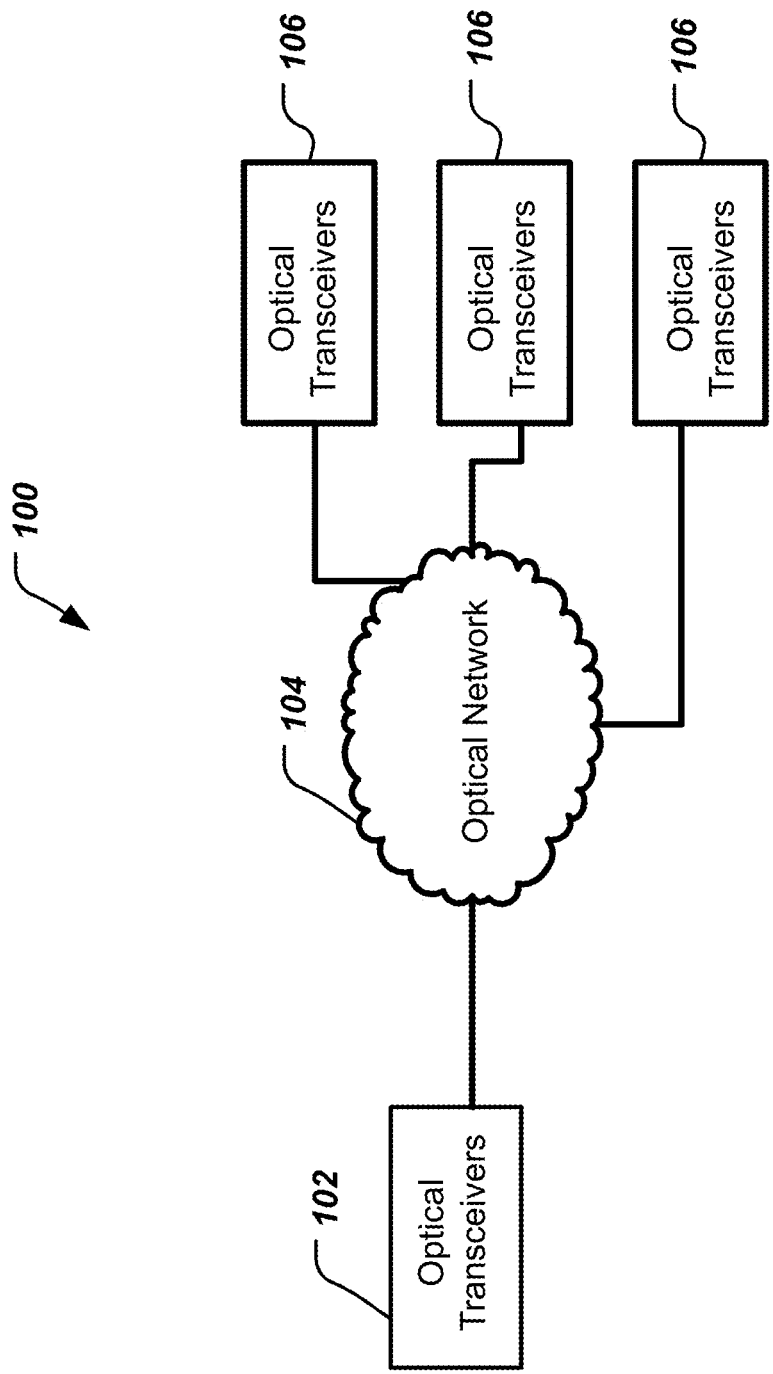
FIG. 1 illustrates an example optical communication network.

FIG. 1 illustrates an example optical communication network 100 in which the presently disclosed technology can be embodied. In the optical communication network 100, one or more optical transceivers 102 are communicatively coupled via an optical network 104 to one or more optical transceivers 106. Here, examples of the optical network 104 may include the PON. The optical network 104 may include optical fibers that extend in length from several hundred meters (e.g., last mile drop) to several thousands of kilometers (long haul networks). In some embodiments of the disclosed technology, the one or more optical transceivers 102 may include the OLT, and the optical transceiver 106 may include the ONU. The transmitted optical signals may go through intermediate optical equipment such as amplifiers, repeaters, switch, etc., which are not shown in FIG. 1 for clarity.

Figure 2:
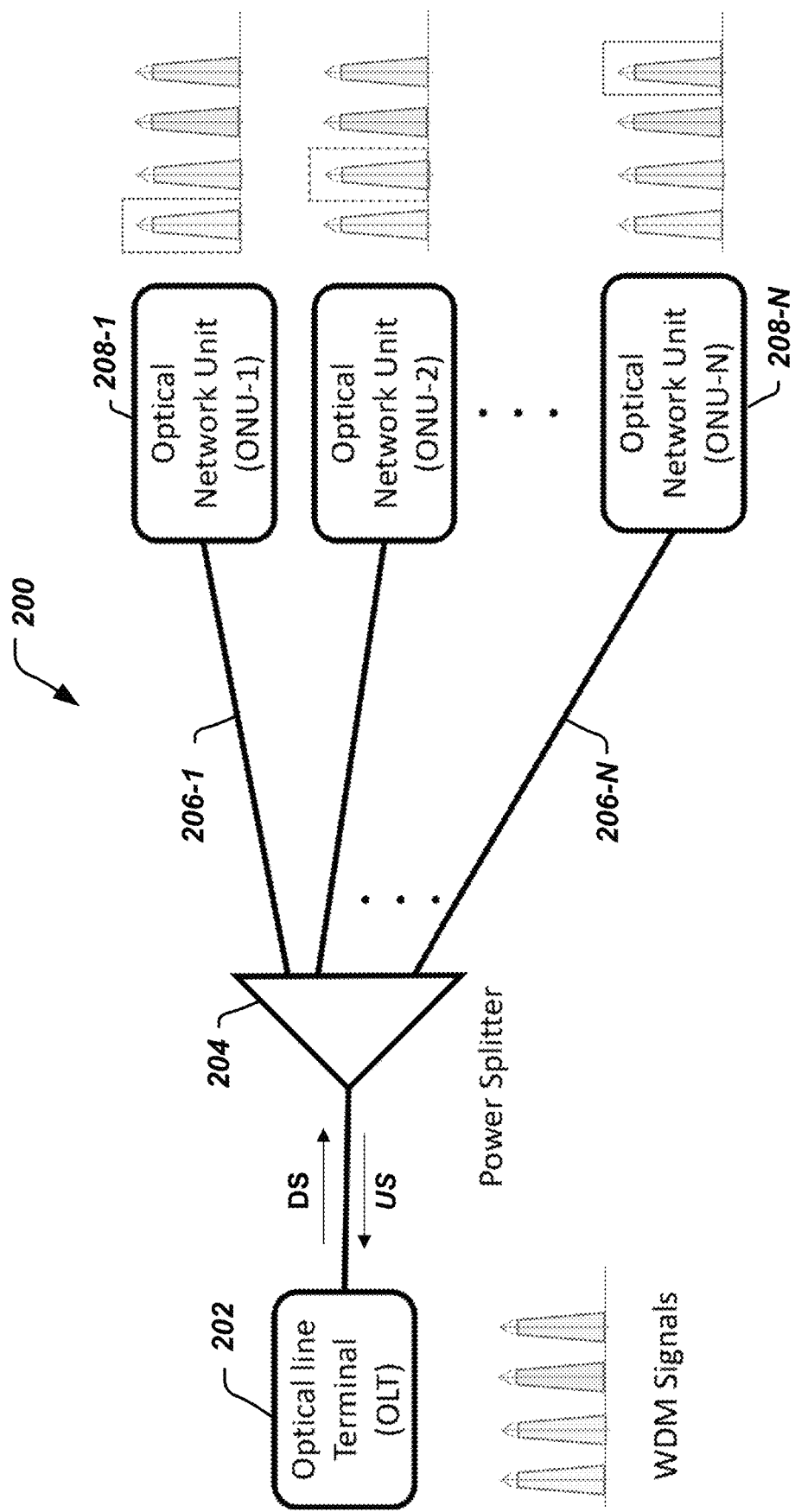
FIG. 2 illustrates an example passive optical network in which a wavelength-selected (WS) wavelength division multiplexing passive optical network (WDM-PON) transmits WDM signals over an optical distributed network based on a power splitter.

FIG. 2 illustrates an example optical communication network 200 in which a wavelength-selected wavelength division multiplexing (WDM) passive optical network (PON) transmits WDM signals over an optical distributed network based on a power splitter 204. A WDM-PON provides each ONU 208-1, ..., or 208-N with at least one dedicated pair of wavelength channels including one downstream (DS) and one upstream (US) having logical point-to-point data connections between the OLT 202 and the ONUs 208-1 to 208-N.

A wavelength-selected WDM-PON utilizes power splitters in the ODN. A wavelength-routed WDM-PON, which uses a wavelength splitter in the ODN so that only the desired wavelength $\lambda_{DS}$ in the downstream (DS) direction can arrive at the assigned ONU. The wavelength-selected WDM-PON can transport signals having various wavelengths via a plurality of distribution fibers 206-1 to 206-N. Thus, the ONUs 208-1 to 208-N have the capability to detect the channels on all the available wavelengths of the optical network. The ONUs, however, can only detect one wavelength at a time. The ONU can be realized by frequency-selected coherent detection, or filter-based direct-detection. For example, the ONU can be implemented by using a wavelength filter to select the desired downstream wavelength and by using a tunable laser to produce the correct upstream wavelength.

The OLT has a WDM-based transceiver, which can detect all channels at the same time, by either one receiver or multiple receivers. The OLT can also transmit downstream signals on all wavelengths at one time, by using multiple transmitters. The ONU, however, has only one transmitter and one receiver, and thus it can only detect one channel at one time and also transmit signal over one wavelength at one time. The ONU receiver can be realized by coherent detection, which is wavelength selective naturally, or by using tunable filter technology to tune to the detection wavelength window. In the wavelength-selected WDM-PON system, registration for ONU will be difficult and time-consuming, since there are multiple wavelengths working in the system, the ONU and OLT need to search and choose the working wavelength before they can establish the communication.

Various embodiments of the disclosed technology include a registration and wavelength allocation process that establishes a logical point-to-point data connection between the OLT and ONU in the wavelength-selected WDM-PON by using a pre-specified wavelength for PON-wide ONU registration. In an example implementation, for the registration and wavelength allocation, an ONU attempting to connect to the OLT tunes its receiver to a specific wavelength ($\lambda_{DS\text{-}Reg}$), and also its transmitter to a specific wavelength ($\lambda_{US\text{-}Reg}$). The ONU then starts the process of registration and message exchange for channel information. After the process of registration is completed, the OLT informs the ONU the assigned wavelength or wavelengths for downstream ($\lambda_{DS\text{-}i}$) and upstream ($\lambda_{US\text{-}i}$). The ONU then tunes its transmitter and receiver to the assigned wavelength or wavelengths ($\lambda_{DS\text{-}i}$, $\lambda_{US\text{-}i}$), and also sets its appropriate transceiver configurations (i.e., power level, LO power and so on).

Figure 3:
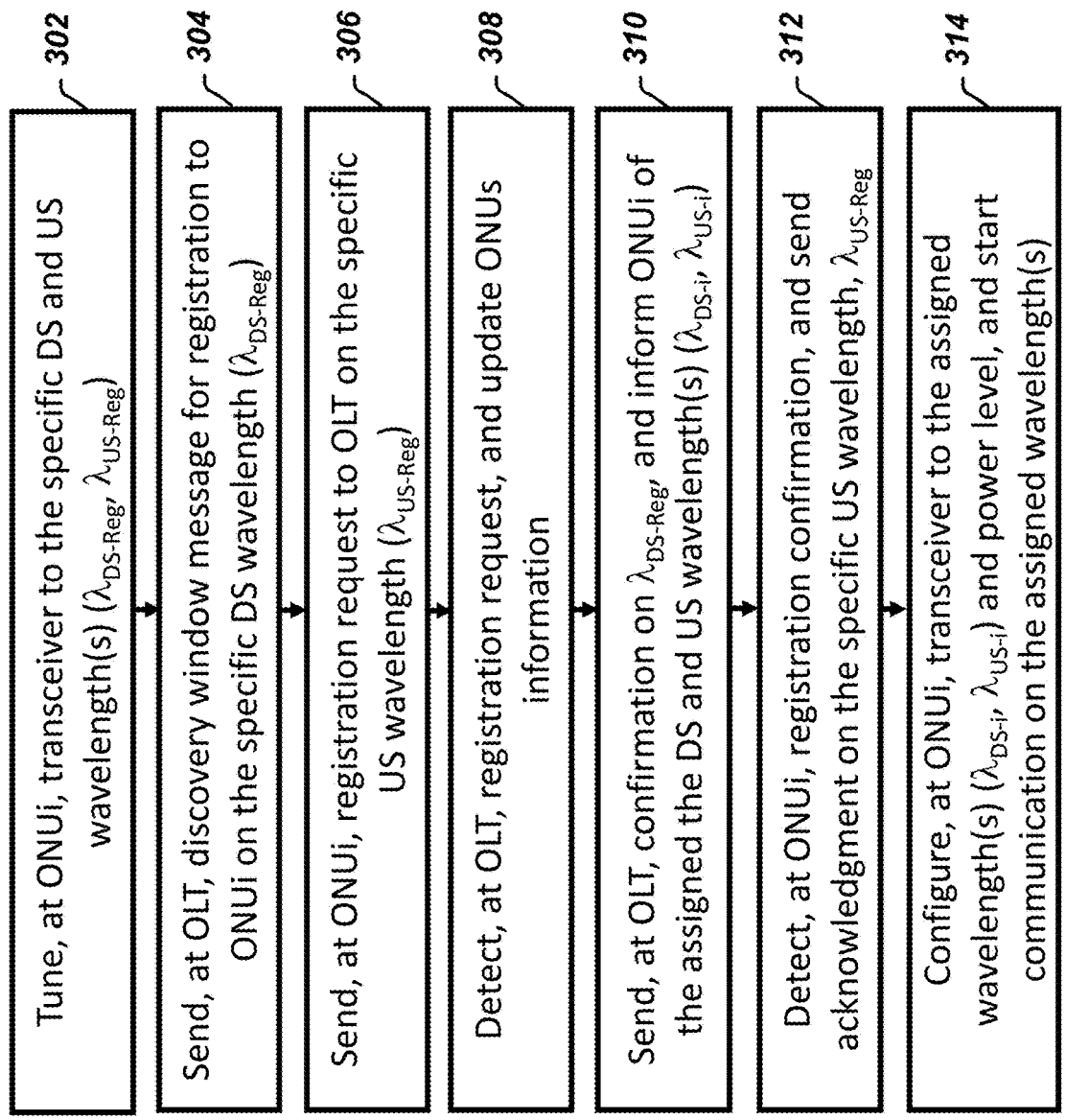
FIG. 3 is a flow chart representation of an example ONU registration process.

FIG. 3 is a flow chart representation of an example ONU registration process. In an example wavelength-selected WDM-PON implemented based on an embodiment of the disclosed technology, at step 302, an optical network unit (ONUi) that is attempting to connect to an OLT tunes its transceiver to the specific downstream (DS; $\lambda_{DS\text{-}Reg}$) and upstream (US; $\lambda_{US\text{-}Reg}$) wavelength(s). At step 304, the OLT sends a message for registration such as discovery window message on the specific DS wavelength ($\lambda_{DS\text{-}Reg}$). At step 306, the ONUi sends a registration request on the specific US wavelength $\lambda_{US\text{-}Reg}$. At step 308, the OLT detects the registration request, and updates the ONUs information. At step 310, the OLT sends a confirmation on the specific DS wavelength ($\lambda_{DS\text{-}Reg}$), and also informs ONUi of the assigned the DS and US wavelength(s), ($\lambda_{DS\text{-}i}$, $\lambda_{US\text{-}i}$). At step 312, the ONUi detects a registration confirmation, and sends an acknowledgment message on the specific US wavelength $\lambda_{US\text{-}Reg}$. At step 314, the ONUi configures its transceiver to the assigned wavelength(s) ($\lambda_{DS\text{-}i}$, $\lambda_{US\text{-}i}$) and power level, and starts communication on the assigned wavelength(s). In some embodiments of the disclosed technology, the wavelength assignment may be saved in a memory or register circuitry in either or both of the OLT and ONU.

Figure 4:
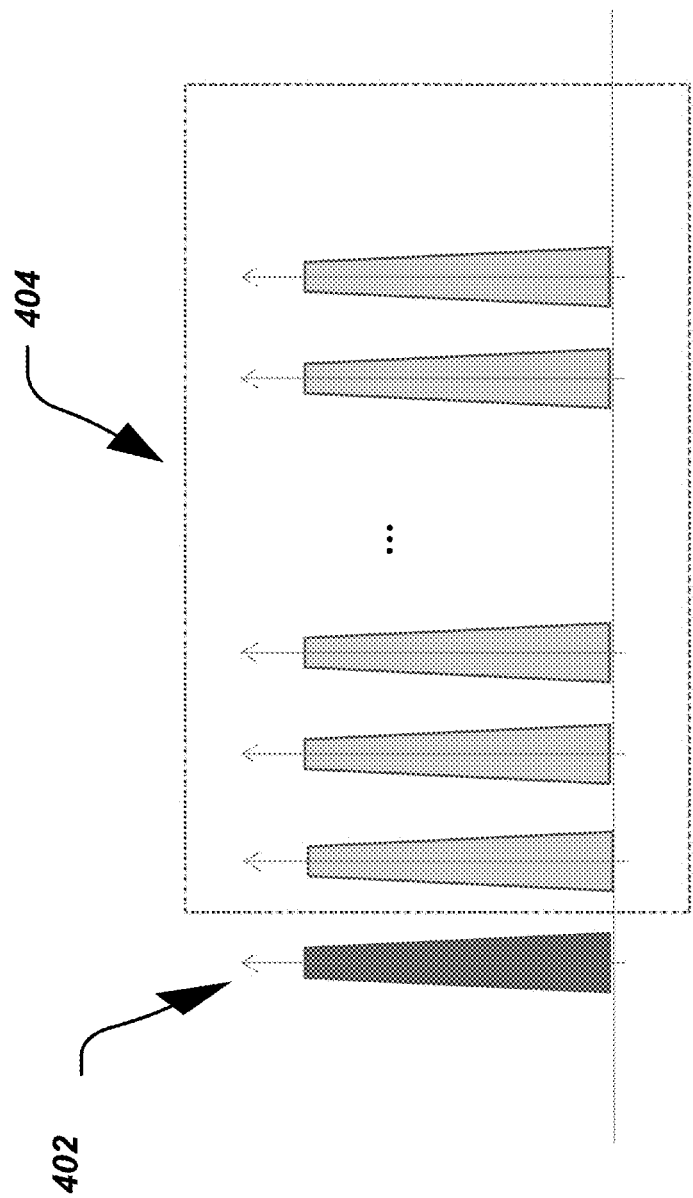
FIG. 4 shows an example ONU registration process implemented based on an embodiment of the disclosed technology.

FIG. 4 shows an example ONU registration process implemented based on an embodiment of the disclosed technology. In FIG. 4, the wavelength-selected WDM-PON may use a specific wavelength 402 (e.g., $\lambda_{DS\text{-}Reg}$ or $\lambda_{US\text{-}Reg}$) for registration purposes only and use N wavelengths 404 for wavelengths for normal service purposes. In such a wavelength-selected WDM-PON having total N+1 wavelengths 402 and 404 in each transmission direction, an ONU goes through a registration process for the OLT to assign one of the N normal service wavelengths to the ONU as discussed above using the specific wavelength 402 (e.g., $\lambda_{DS\text{-}Reg}$ and $\lambda_{US\text{-}Reg}$) reserved for registration. Here, information regarding the assigned wavelength can be stored in a storage device such as memory or register circuitry.

If a certain ONU (e.g., ONU-k) goes offline and needs to reboot, the ONU-k can register, after reboot, by retrieving the saved wavelength assignment from the memory or register circuitry. Alternatively, when a certain ONU (e.g., ONU-k) goes offline and needs to reboot, the ONU-k can register through a registration process using the specific wavelength 402 (e.g., $\lambda_{DS\text{-}Reg}$ and $\lambda_{US\text{-}Reg}$) as shown in FIG. 3. If the ONU-k malfunctions and needs to be replaced by a new ONU, the new ONU performs a registration process via the specific wavelength 402 (e.g., $\lambda_{DS\text{-}Reg}$ and $\lambda_{US\text{-}Reg}$). By using the specific wavelength 402 (e.g., $\lambda_{DS\text{-}Reg}$ and $\lambda_{US\text{-}Reg}$) reserved for registration, ONUs can establish the logical point-to-point data connections with the OLT more effectively.

Figure 5:
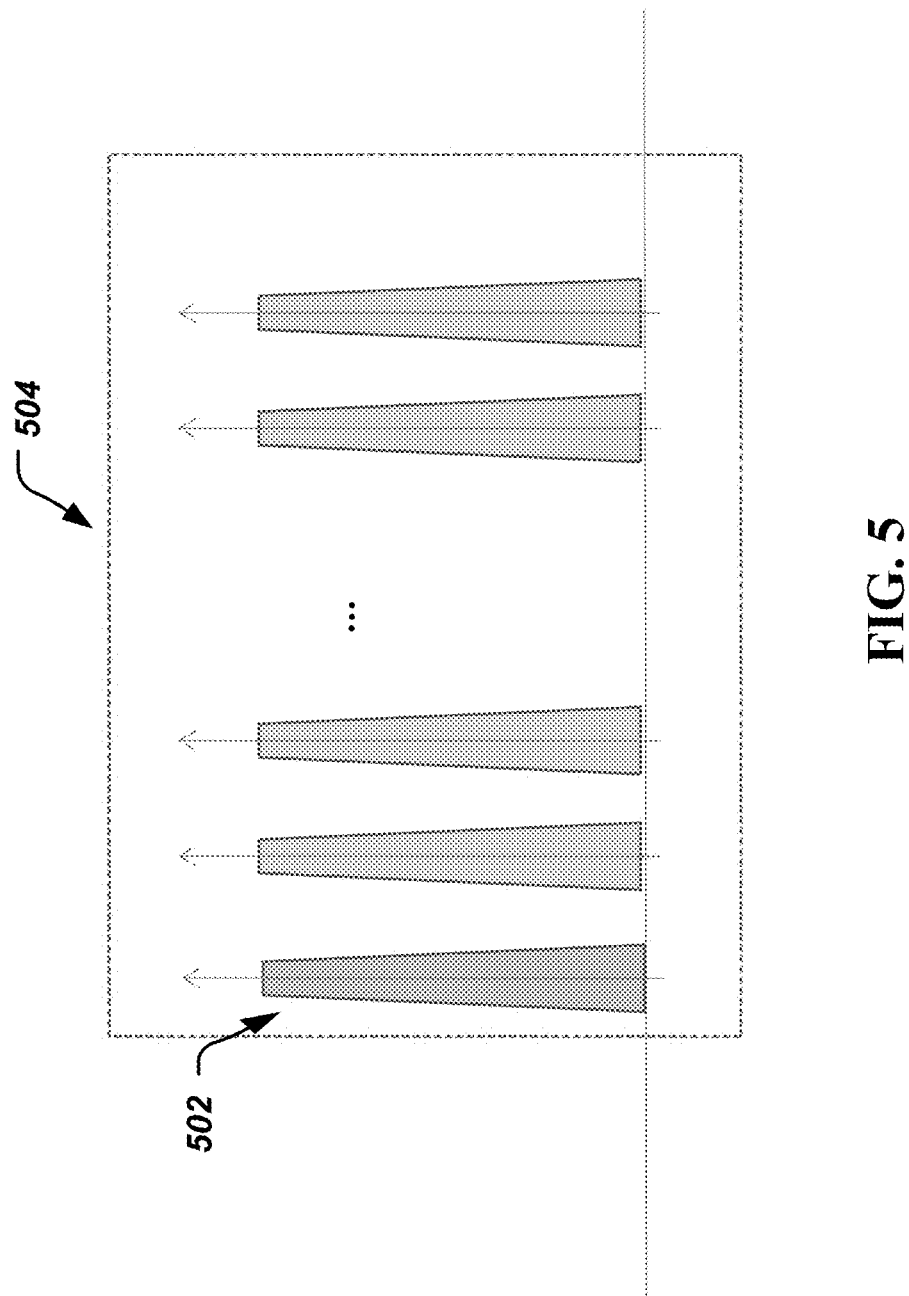
FIG. 5 shows another example ONU registration process implemented based on another embodiment of the disclosed technology.

FIG. 5 shows another example ONU registration process implemented based on another embodiment of the disclosed technology. In FIG. 5, the wavelength-selected WDM-PON may use a specific wavelength 502 (e.g., $\lambda_{DS\text{-}Reg}$ or $\lambda_{US\text{-}Reg}$) for registration purposes initially and then use the specific wavelength for normal service purposes after the registration process. In such a wavelength-selected WDM-PON having total N wavelengths 504 in each transmission direction, an ONU goes through a registration process for the OLT to assign one of N-1 normal service wavelengths to the ONU using a specific wavelength 502 that is used for registration initially.

The wavelength-selected WDM-PON includes total N wavelengths in each transmission direction. One specific wavelength in each direction ($\lambda_{DS\text{-}Reg}$ and $\lambda_{US\text{-}Reg}$) is initially reserved for registration until when the Nth user joins. Registration for all ONUs (e.g., first ONU to Nth ONU except the specific wavelength) can be performed as shown in FIG. 3. After completion of the registration (e.g., after assigning all normal service wavelengths to ONUs), specific wavelengths in each direction ($\lambda_{DS\text{-}Reg}$ and $\lambda_{US\text{-}Reg}$) are assigned for actual service. For example, when wavelengths $\lambda_{DS\text{-}Reg}$ and $\lambda_{US\text{-}Reg}$ are reserved for registration purposes and used to assign second through $N^{th}$ wavelengths to first through $(N-1)^{th}$ ONUs, respectively. After assigning the Nth wavelength to the $(N-1)^{th}$ ONU, the specific wavelengths in each direction ($\lambda_{DS\text{-}Reg}$ and $\lambda_{US\text{-}Reg}$) are assigned to $N^{th}$ ONU for actual service. Here, information regarding the assigned wavelength can be stored in a storage device such as memory or register circuitry.

In an implementation, all ONUs periodically send status information to the OLT. If a certain ONU (e.g., ONU-k) assigned to a wavelength k goes offline and needs to reboot in a short time, the ONU-k, after reboot, retrieves the saved wavelength assignment from the memory or register circuitry. If the ONU-k malfunctions and needs to be replaced by a new ONU-k, the OLT knows the ONU-k is offline because of lack of the status information report, and thus the OLT reassigns another ONU (e.g., ONU-N) to the wavelength k. The new ONU-k registers via $\lambda_{DS\text{-}Reg}$ and $\lambda_{US\text{-}Reg}$. If the ONU-k unsubscribes, the OLT knows wavelength k is now available and reassigns another ONU (e.g., ONU-N) to wavelength k.

The wavelength-selected WDM-PON implemented based on an embodiment of the disclosed technology may periodically perform a status check for the ONUs. For example, the ONUs periodically send status information to the OLT by some information field bits, including its ID and occupied wavelength ID, to keep it active. The OLT maintains the wavelength resource pool by marking each wavelength resource as unoccupied or occupied and by updating as to which ONU is currently occupying which wavelength. Once the OLT fails to receive any status information from a certain ONU (e.g., ONU-i), the OLT will mark the wavelength occupied by the ONU-i as unoccupied, and release this wavelength to the resource pool.

In an implementation where the wavelength-selected WDM-PON uses a specific wavelength (e.g., $\lambda_{DS\text{-}Reg}$ or $\lambda_{US\text{-}Reg}$) for registration purposes only, no operation is needed for other wavelengths because, when a new ONU is online, the unoccupied wavelength will be assigned to the new ONU.

In another implementation where the wavelength-selected WDM-PON uses a specific wavelength (e.g., $\lambda_{DS\text{-}Reg}$ or $\lambda_{US\text{-}Reg}$) for registration purposes initially and then uses the specific wavelength for normal service purposes later, a normal service wavelength (unoccupied service wavelength) becomes available in the resource pool, the specific wavelength ($\lambda_{DS\text{-}Reg}$ and $\lambda_{US\text{-}Reg}$) is released, and the ONU that have been using the specific wavelengths for registration ($\lambda_{DS\text{-}Reg}$ and $\lambda_{US\text{-}Reg}$) will be reassigned with the newly released wavelength.

Figure 6:
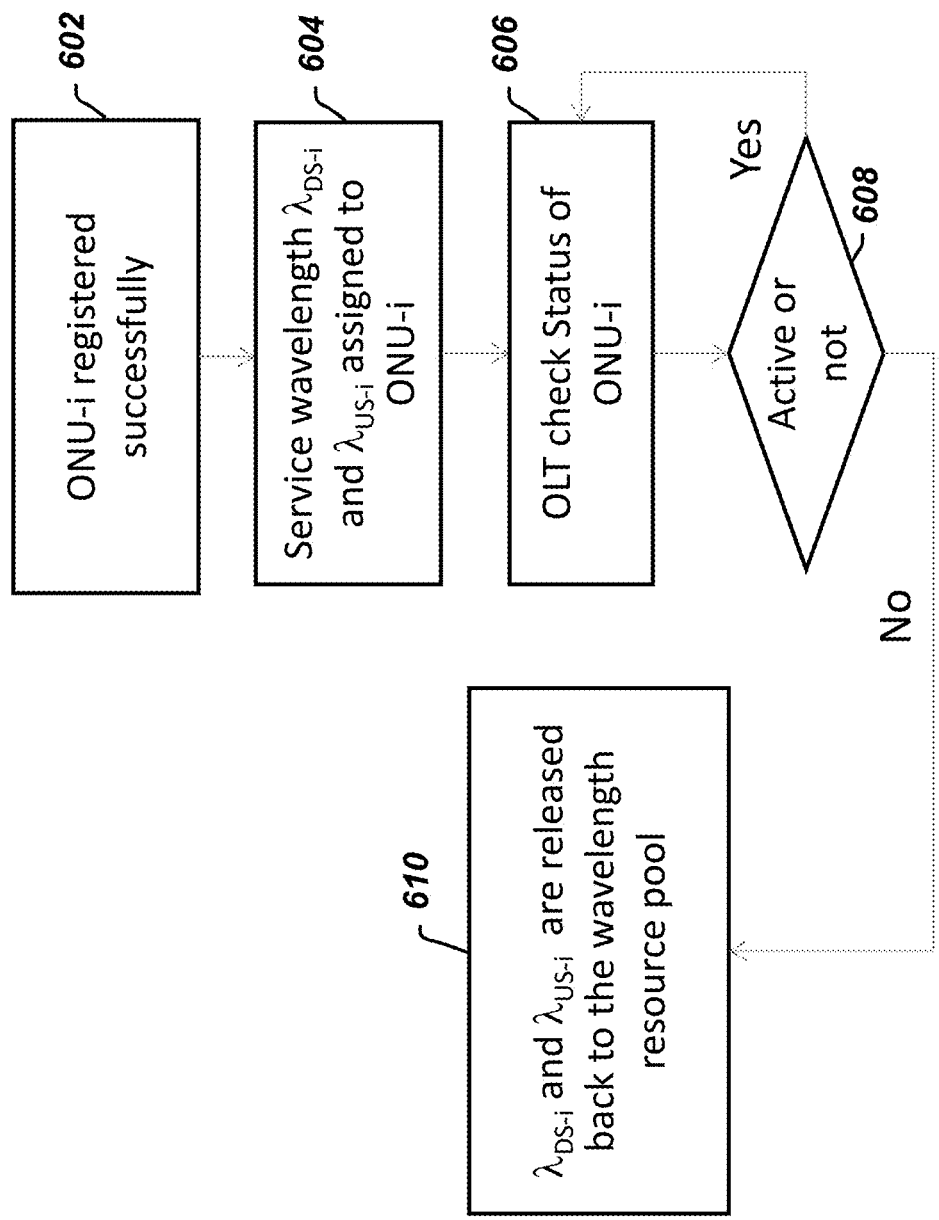
FIG. 6 is a flow chart representation of an example implementation of wavelength resource pool maintenance by periodic status check based on an embodiment of the disclosed technology.

FIG. 6 is a flow chart representation of an example implementation of wavelength resource pool maintenance by periodic status check based on an embodiment of the disclosed technology. When an ONU (e.g., ONU-i) is registered successfully at step 602, the OLT assigns DS and US wavelength(s) $\lambda_{DS\text{-}i}$ and $\lambda_{US\text{-}i}$ to the ONU-I at step 604. At step 606, the OLT periodically performs a status check. For example, each ONU including ONU-i periodically sends status information to the OLT and the OLT checks the status. At step 608, if the ONU-i fails to send status information within a certain period of time, or if the ONU-i fails to respond to several status check request from the OLT, the ONU-i will be marked as "inactive." If the ONU-i sends status information, the ONU-i will be marked as "active." If the ONU-i is marked as "active," then the periodic status check will be conducted at the next status check timings. If the ONU-i is marked as "inactive," the wavelengths $\lambda_{DS\text{-}i}$ and $\lambda_{US\text{-}i}$ are released back to the wavelength resource pool at step 610.

The wavelength-selected WDM-PON implemented based on an embodiment of the disclosed technology may provide backup options for registration wavelength protection. In case the specific $1_{DS\text{-}Reg}$ and $1_{US\text{-}Reg}$ assigned for registration fails, the wavelength-selected WDM-PON may add another wavelength in each direction as a backup registration wavelength. Alternatively, another service wavelength in each direction can be re-assigned to take the role of wavelength $\lambda_{DS\text{-}Reg}$ and $\lambda_{US\text{-}Reg}$. When a new ONU goes online, if no response is received from the specific wavelength $1_{DS\text{-}Reg}$ and $1_{US\text{-}Re}$ after several tries, the ONU may also use the backup registration wavelength.

In an embodiment of the disclosed technology, a method of communication includes several steps. One step includes receiving, by an optical line terminal (OLT), a registration request from an optical network unit (ONU) through a specific upstream wavelength. Another step includes assigning, by the OLT a normal service upstream wavelength and a normal service downstream wavelength to the ONU for a normal service between the ONU and the OLT. The normal service upstream wavelength and the normal service downstream wavelength are assigned from a wavelength resource pool including a plurality of normal service upstream wavelengths and a plurality of normal service downstream wavelengths therein. Additional step includes informing, through a specific downstream wavelength, the ONU of information regarding the normal service upstream wavelength and the normal service downstream wavelength. Here, the specific downstream and upstream wavelengths are reserved for a registration process that includes receiving, through the specific upstream wavelength, the registration request and sending, through the specific downstream wavelength, the information regarding the normal service upstream wavelength and the normal service downstream wavelength.

The method of communication may further include additional steps. For example, additional steps may include initially reserving the specific downstream wavelength and the specific upstream wavelength for the registration process. After assigning all normal service wavelengths to ONUs, the specific upstream wavelength may be assigned as a normal service wavelength. For example, after assigning all of the plurality of normal service upstream wavelengths to ONUs, the specific upstream wavelength may be assigned as a normal service upstream wavelength. Furthermore, after assigning all of the plurality of normal service downstream wavelengths to ONUs, the specific downstream wavelength may be assigned as a normal service downstream wavelength. In some embodiments of the disclosed technology, after assigning all of the plurality of normal service upstream wavelengths and normal service downstream wavelengths to ONUs, the specific upstream wavelength and downstream wavelength are assigned as normal service upstream wavelength and normal service downstream wavelength.

The method of communication may further include releasing one or both of the specific downstream wavelength that has been assigned as the normal service downstream wavelength and the specific upstream wavelength that has been assigned as the normal service upstream wavelength, to use the one or both of the released specific downstream wavelength and the released upstream wavelength for the registration process. If one or both of a particular normal service downstream wavelength and a particular normal service upstream wavelength becomes available in the wavelength resource pool, the specific downstream and upstream wavelengths now being used as normal service downstream and upstream wavelengths are released to be used as the specific downstream and upstream wavelengths for the registration process. Subsequently, the one or both of the particular normal service downstream and the particular normal service upstream service wavelength may be reassigned to the ONU that has been using the one or both of the specific downstream wavelength and the specific upstream wavelengths for normal service purposes.

In another embodiment of the disclosed technology, a method of communication may include several steps. An optical network unit (ONU) is tuned to a specific downstream wavelength and a specific upstream wavelength. The ONU receives a discovery window message for registration through the specific downstream wavelength, from an optical line terminal (OLT). The ONU sends a registration request to the OLT through the specific upstream wavelength. The ONU receives a registration confirmation message from the OLT. In addition, the ONU may send an acknowledgement to the OLT through the specific upstream wavelength in response to the registration confirmation. The method of communication also includes configuring the ONU to a normal service upstream wavelength and a normal service downstream wavelength, out of a plurality of normal service upstream wavelengths and a plurality of normal service downstream wavelengths in a wavelength resource pool, for a normal service between the ONU and the OLT. Here, the specific downstream and upstream wavelengths are reserved for a registration process including sending the registration request and the registration confirmation and receiving the acknowledgement and information regarding the normal service upstream wavelength and the normal service downstream wavelength.

The method of communication may further include releasing one or both of the specific downstream wavelength that has been assigned as the normal service downstream wavelength and the specific upstream wavelength that has been assigned as the normal service upstream wavelength, to use the one or both of the released specific downstream wavelength and the released upstream wavelength for the registration process, if one or both of a particular normal service downstream wavelength and a particular normal service upstream wavelength becomes available in the wavelength resource pool. Subsequently, the one or both of the particular normal service downstream and the particular normal upstream service wavelength may be reassigned to the ONU that has been using the one or both of the specific downstream wavelength and the specific upstream wavelength for normal service purposes.

The method of communication may further include releasing one or both of the specific downstream wavelength that has been assigned as the normal service downstream wavelength and the specific upstream wavelength that has been assigned as the normal service upstream wavelength, to use the one or both of the released specific downstream wavelength and the released upstream wavelength for the registration process, if one or both of a particular normal service downstream wavelength and a particular normal service upstream wavelength becomes available in the wavelength resource pool. Subsequently, the one or both of the particular normal service downstream and the particular normal upstream service wavelength may be assigned to the ONU that has been using the one or both of the specific downstream wavelength and the specific upstream wavelength for normal service purposes.

Figure 7:
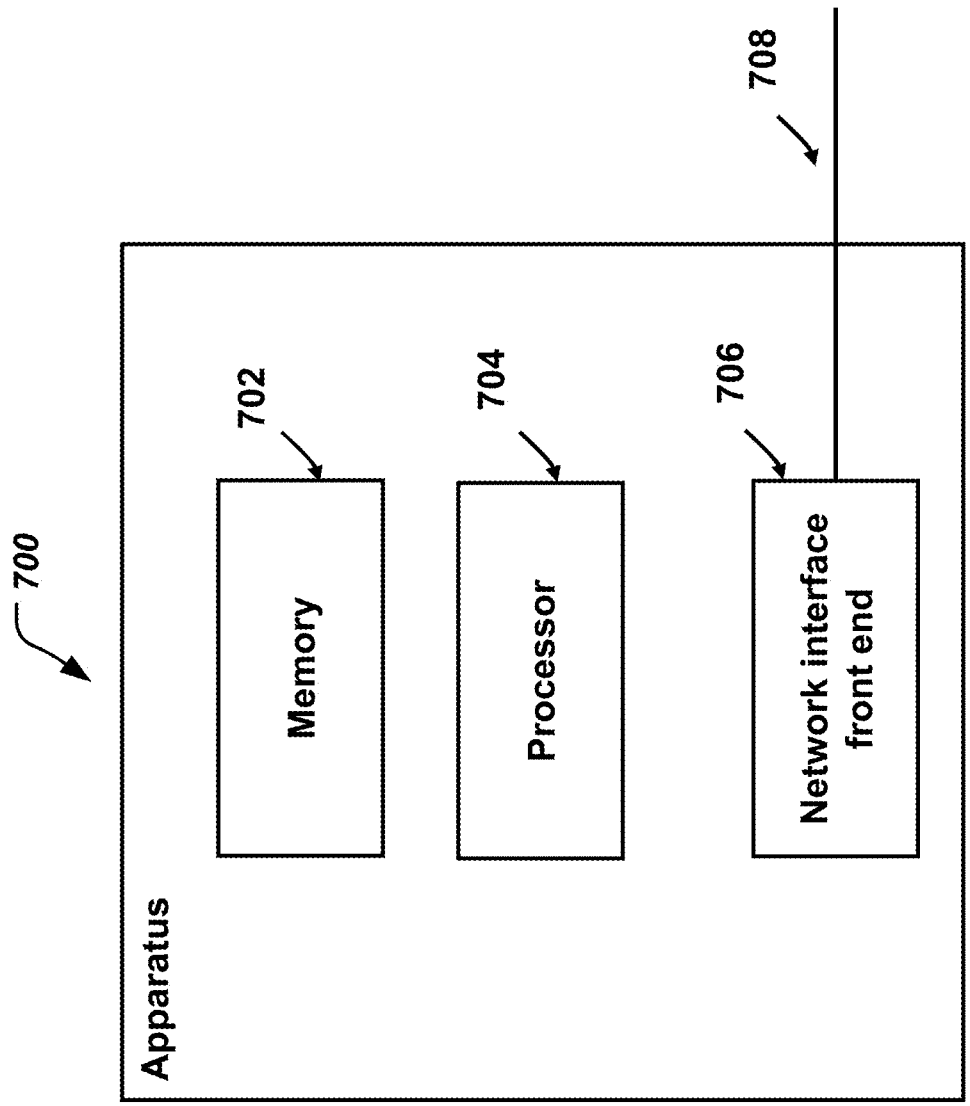
FIG. 7 is a block diagram showing an example of an apparatus used to implement a disclosed technique.

FIG. 7 is a block diagram of an example communication apparatus 700. The apparatus 700 may include one or more memories 702, one or more processors 704 and a network interface front end 706 communicatively coupled to a communication link 708. The one or more memories 702 may store processor-executable instructions and/or data during processor operation. The one or more processors 704 may read instructions from the one or memories 702 and implement a technique described in the present document. The apparatus 700 may implement various methods including the ONU registration process, periodic status check, and backup options for registration wavelength protection described herein.

As discussed above, in a wavelength-selected WDM-PON, various embodiments of the disclosed technology may provide effective ONU registration that can be conducted by using a pre-specified wavelength dedicated to ONU registration. The disclosed technology also provides various embodiments regarding the wavelength resource pool management. By using a specific wavelength reserved for registration, ONUs can establish the logical point-to-point data connections with the OLT more effectively, and such established connections can be effectively managed by the periodic status check discussed above.

The disclosed and other embodiments, algorithms, modules and the functional operations described in the present document can be implemented in digital electronic circuitry, or in computer software, firmware, or hardware, including the structures disclosed in the present document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

In implementing the ONU registration algorithm discussed in the present document, a computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the present document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the present document contains many specifics, these should not be construed as limitations on the scope of an invention that is claimed or of what may be claimed, but rather as descriptions of features specific to particular embodiments. Certain features that are described in present document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of communication, comprising:
sending, by an optical line terminal (OLT), to an optical network unit (ONU), a discovery message for registration through a specific downstream wavelength;
receiving, by the OLT, a registration request from the ONU through a specific upstream wavelength;
assigning, by the OLT, out of a plurality of normal service upstream wavelengths and a plurality of normal service downstream wavelengths, a normal service upstream wavelength and a normal service downstream wavelength to the ONU;
sending, through the specific downstream wavelength to the ONU, a confirmation that the OLT has received the registration request,
wherein the specific downstream and upstream wavelengths are reserved for a registration process that includes receiving, through the specific upstream wavelength, the registration request and sending, through the specific downstream wavelength, a discovery window message and information regarding the normal service upstream wavelength and the normal service downstream wavelength;
reserving the specific downstream wavelength and the specific upstream wavelength for the registration process; and
assigning, after assigning all of the plurality of normal service upstream wavelengths to ONUs, the specific upstream wavelength as a normal service upstream wavelength, or assigning, after assigning all of the plurality of normal service downstream wavelengths to ONUs, the specific downstream wavelength as a normal service downstream wavelength, or assigning, after assigning all of the plurality of normal service upstream wavelengths and normal service downstream wavelengths to ONUs, the specific upstream wavelength and downstream wavelength as normal service upstream wavelength and normal service downstream wavelength.

2. The method of claim 1, further comprising:
releasing one or both of the specific downstream wavelength that has been assigned as the normal service downstream wavelength and the specific upstream wavelength that has been assigned as the normal service upstream wavelength, to use the one or both of the released specific downstream wavelength and the released upstream wavelength for the registration process, if one or both of a particular normal service downstream wavelength and a particular normal service upstream wavelength becomes available;
reassigning the one or both of the particular normal service downstream and the particular normal service upstream service wavelength to the ONU that has been using the one or both of the specific downstream wavelength and the specific upstream wavelength.

3. The method of claim 1, further comprising sending, by the OLT, to the ONU, information regarding the normal service upstream wavelength and the normal service downstream wavelength.

4. The method of claim 1, further comprising reassigning, by the OLT, the assigned normal service downstream wavelength and the assigned normal service upstream wavelength to another ONU, if the ONU is replaced by the another ONU.

5. The method of claim 1, wherein the OLT marks each normal service upstream wavelength and each normal service downstream wavelength as unoccupied or occupied and updates as to which ONU is currently occupying which normal service upstream wavelength and normal service downstream wavelength.

6. The method of claim 1, further comprising periodically receiving, at the OLT, status information from the ONU, after assigning the normal service upstream wavelength and the normal service downstream wavelength to the ONU.

7. A method of communication, comprising:
sending, by an optical line terminal (OLT), to an optical network unit (ONU), a discovery message for registration through a specific downstream wavelength;
receiving, by the OLT, a registration request from the ONU through a specific upstream wavelength;
assigning, by the OLT, out of a plurality of normal service upstream wavelengths and a plurality of normal service downstream wavelengths, a normal service upstream wavelength and a normal service downstream wavelength to the ONU;
sending, through the specific downstream wavelength to the ONU, a confirmation that the OLT has received the registration request,
wherein the specific downstream and upstream wavelengths are reserved for a registration process that includes receiving, through the specific upstream wavelength, the registration request and sending, through the specific downstream wavelength, a discovery window message and information regarding the normal service upstream wavelength and the normal service downstream wavelength; and
replacing the one or both of the specific downstream wavelength and the specific upstream wavelength with one or both of a normal service downstream wavelength and a normal service upstream wavelength, respectively, when the one or both of the specific downstream wavelength and the specific upstream wavelength for the registration process fails.

8. A method of communication, comprising:
sending, by an optical line terminal (OLT), to an optical network unit (ONU), a discovery message for registration through a specific downstream wavelength;
receiving, by the OLT, a registration request from the ONU through a specific upstream wavelength;

assigning, by the OLT, out of a plurality of normal service upstream wavelengths and a plurality of normal service downstream wavelengths, a normal service upstream wavelength and a normal service downstream wavelength to the ONU;

sending, through the specific downstream wavelength to the ONU, a confirmation that the OLT has received the registration request, wherein the specific downstream and upstream wavelengths are reserved for a registration process that includes receiving, through the specific upstream wavelength, the registration request and sending, through the specific downstream wavelength, a discovery window message and information regarding the normal service upstream wavelength and the normal service downstream wavelength; and periodically receiving, at the OLT, status information from the ONU, after assigning the normal service upstream wavelength and the normal service downstream wavelength to the ONU, wherein the OLT marks the normal service upstream wavelength and the normal service downstream wavelength occupied by the ONU as unoccupied if the OLT fails to receive any status information from the ONU and releases the normal service upstream wavelength and the normal service downstream wavelength to a wavelength resource pool.

9. A method of communication, comprising:

tuning an optical network unit (ONU) to a specific downstream wavelength and a specific upstream wavelength;

sending, by the ONU, a registration request to an optical line terminal (OLT) through the specific upstream wavelength;

receiving, by the ONU, a registration confirmation message that the OLT has received the registration request; and configuring the ONU to a normal service upstream wavelength and a normal service downstream wavelength, wherein the specific downstream and upstream wavelengths are reserved for a registration process including sending, through the specific upstream wavelength, the registration request and receiving, through the specific downstream wavelength, the registration confirmation;

reserving the specific downstream wavelength and the specific upstream wavelength for the registration process; and assigning, after assigning all of the plurality of normal service upstream wavelengths to ONUs, the specific upstream wavelength as a normal service upstream wavelength, or assigning, after assigning all normal service downstream wavelengths to ONUs, the specific downstream wavelength as a normal service downstream wavelength, or assigning, after assigning all of the plurality of normal upstream and downstream wavelengths to ONUs, the specific upstream and downstream wavelengths as normal service upstream and downstream wavelengths.

10. The method of claim 9, further comprising:

releasing one or both of the specific downstream wavelength that has been assigned as the normal service downstream wavelength and the specific upstream wavelength that has been assigned as the normal service upstream wavelength, to use the one or both of the released specific downstream wavelength and the released upstream wavelength for the registration process, if one or both of a particular normal service downstream wavelength and a particular normal service upstream wavelength becomes available; and reassigning the one or both of the particular normal service downstream and the particular normal upstream service wavelength to the ONU that has been using the one or both of the specific downstream wavelength and the specific upstream wavelength.

11. The method of claim 9, wherein the normal service downstream and upstream wavelengths that are being used by the ONU are saved in a memory or register circuitry in either or both of the OLT and ONU.

12. The method of claim 11, wherein, when the ONU goes offline and needs to reboot in a short time, the ONU retrieves the saved normal service downstream and upstream wavelength assignment from the memory or register circuitry.

13. The method of claim 9, further comprising periodically sending, by the ONU, status information to the ONU, after configuring the ONU to the normal service upstream wavelength and the normal service downstream wavelength.

14. An optical transceiver apparatus, comprising:

an I/O interface communicatively coupled via an optical transmission medium to another optical transceiver apparatus;

a memory to store executable instructions; and a processor in communication with the memory, configured to read the executable instructions from the memory to:

send, by an optical line terminal (OLT), to an optical network unit (ONU), a discovery window message for registration through a specific downstream wavelength;

receive, by the OLT, a registration request from the ONU through a specific upstream wavelength;

assign, by the OLT, out of a plurality of normal service upstream wavelengths and a plurality of normal service downstream wavelengths in a wavelength resource pool, a normal service upstream wavelength and a normal service downstream wavelength to the ONU for a normal service between the ONU and the OLT; and sending, through the specific downstream wavelength to the ONU, a confirmation that the OLT has received the registration request, wherein the specific downstream and upstream wavelengths are reserved for a registration process including receiving, through the specific upstream wavelength, the registration request and sending, through the specific downstream wavelength, information regarding the assigned normal service upstream wavelength and the assigned normal service downstream wavelength.

15. The apparatus of claim 14, wherein the specific downstream and upstream wavelengths are initially reserved for the registration process, and, after assigning all the plurality of normal service upstream wavelengths and all the plurality of normal service downstream wavelengths in the wavelength resource pool to ONUS, the specific downstream and upstream wavelengths are assigned as a normal service downstream wavelength and a normal service upstream wavelength.

16. The apparatus of claim 14, further comprising reassigning, at the OLT, the assigned normal service downstream wavelength and the assigned normal service upstream wavelength to another ONU, if the ONU is replaced by the another ONU.

17. The apparatus of claim 14, further comprising periodically receiving, by the OLT, status information sent from the ONU, after assigning the normal service upstream wavelength and the normal service downstream wavelength to the ONU.

18. The apparatus of claim 17, wherein the OLT marks the normal service upstream wavelength and the normal service downstream wavelength occupied by the ONU as unoccupied if the OLT fails to receive any status information from the ONU and releases the normal service upstream wavelength and the normal service downstream wavelength to the wavelength resource pool.

* * * * *

UNITED STATES PATENT AND TRADEMARK OFFICE
CERTIFICATE OF CORRECTION

PATENT NO. : 11,784,741 B2
APPLICATION NO. : 17/196920
DATED : October 10, 2023
INVENTOR(S) : Jun Shan Wey It is certified that error appears in the above-identified patent and that said Letters Patent is hereby corrected as shown below:

In the Claims

Column 14, Line 57, Claim 15, delete "ONUS," and insert -- ONUs, --, therefor

Signed and Sealed this
Twenty-eighth Day of November, 2023

Katherine Kelly Vidal
*Director of the United States Patent and Trademark Office*